(12) United States Patent
Simon et al.

(10) Patent No.: US 7,246,374 B1
(45) Date of Patent: Jul. 17, 2007

(54) ENHANCING COMPUTER SYSTEM SECURITY VIA MULTIPLE USER DESKTOPS

(75) Inventors: Daniel R. Simon, Redmond, WA (US); Dirk Balfanz, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/524,124

(22) Filed: Mar. 13, 2000

(51) Int. Cl.
*G06F 7/06* (2006.01)

(52) U.S. Cl. ............................ 726/16; 726/17; 726/18; 726/20; 726/21; 713/167

(58) Field of Classification Search ................ 713/200, 713/167; 709/224; 726/16–21
See application file for complete search history.

(56) References Cited

U.S. PATENT DOCUMENTS

| | | | |
|---|---|---|---|
| 5,835,722 A * | 11/1998 | Bradshaw et al. .......... | 709/225 |
| 6,029,246 A * | 2/2000 | Bahr .......................... | 713/200 |
| 6,505,300 B2 | 1/2003 | Chan et al. | |

OTHER PUBLICATIONS

Microsft Press, Microsoft Windows NT Workstation Resource Kit, 1996, Microsoft Press, Chapter 6.*
Microsft Press, Microsoft Windows NT Workstation Resource Kit, 1996, Microsoft Press, Chapter 6pp. 147-161.*
Butler Lampson, "Protection", In Proceedings of the Fifth Princeton Symposium on Information Sciences and Systems, pp. 437-443, Princeton University, Mar. 1971.
D. Elliot Bell and Lenoard H. PaPadula. "Secure Computer System: Unified Exposition and Multics Interpretation", Technical Report, MITRE Corporation, Mar. 1976.
Robert Wahbe, Steven Lucco, Thomas E. Anderson and Susan L. Graham. "Efficient Software-Based Fault Isolation", In Proceedings of the Symposium on Operating System Principles, pp. 203-216, 1993.
Ian Goldberg, David Wagner, Randi Thomas and Eric A. Brewer, "A Secure Environment for Untrusted Helper Applications", In Proceedings of the Sixth USENIX Security Symposium, 1996.
Ravi S. Sandhu, Edward J. Coyne, Hal L. Feinstein and Charles E. Youman, Role-Based Access Control Models, IEEE Computer, 29(2):38-47, 1996.
Kenneth M. Walker, Daniel F. Sterne, M. Lee Badger, Michael J. Petkac, David L. Sherman and Karen A. Oostendorp, "Confining Root Programs with Domain and Type Enforcement", In Proceedings of the Sixth USENIX Security Symposium, 1996.
Qun Zhong, "Providing Secure Environments for Untrusted Network Applications- with Case Studies Using VirtualVault and Trusted Sendmail Proxy", In Proceedings of Second IEEE International Workshop on Enterprise Security, pp. 277-283, Los Alamitos, California, 1997.
Qun Zhong and Nigel Edwards, "Security in the Large: Is Java's Sandbox Scalable?", HP Laboratories Bristol, pp. 2-7, Apr. 1998.
Alma Whitten and J.D. Tygar, "Why Johnny Can't Encrypt: A Usability Evaluation of PGP 5.0", In Proceedings of the 8th USENIX Security Symposium, Washington, D.C., Aug. 1999.

* cited by examiner

*Primary Examiner*—Gilberto Barrón, Jr.
*Assistant Examiner*—Jacob Lipman

(57) ABSTRACT

Users can create multiple different desktops for themselves and easily switch between these desktops. These multiple desktops are "walled off" from one another, limiting the ability of processes and other subjects in one desktop from accessing objects, such as data files or other processes, in another desktop. According to one aspect, each time a process is launched it is associated with the desktop that it is launched in. Similarly, objects, such as data files or resources, are associated with the same desktop as the process that created them. The operating system allows a process to access only those objects that are either associated with the same desktop as the process or associated with no desktop.

41 Claims, 11 Drawing Sheets

ENHANCING COMPUTER SYSTEM SECURITY VIA MULTIPLE USER DESKTOPS

TECHNICAL FIELD

This invention relates to computer system security, and more particularly to enhancing computer system security using multiple computer desktops.

BACKGROUND

As computer systems have become more and more commonplace, so too have, they become increasingly interconnected. Data and applications are more easily transferred among computers, such as via the Internet or other networks. Such interconnectivity creates numerous security problems for individual computers. For example, a computer can become infected with a virus or other malicious application that attempts to obtain or destroy confidential information, impersonate another program, etc.

An additional problem facing system designers is that of user-friendliness. Security schemes or methods that are not easily understandable to the typical user are most likely not going to be used. If a user does not understand the security scheme, then the user will most likely either not use various features of the computer because he or she cannot figure out how to work within the constraints of the security scheme, or alternatively the user will simply bypass the security scheme, leaving his or her system vulnerable to attack.

Various security schemes have been proposed to guard against compromising or loss of data on a computer. According to one such scheme, each application has its own security controls and features, protecting itself as well as the data it maintains. However, this forces a user to keep track of the different security controls, and their settings, for each application that he or she uses, which can quickly become overwhelming for the user. According to another such scheme, referred to as "sandboxing", a program that is downloaded from the Internet is given a set of stringent functionality restrictions (e.g., all file accesses are prohibited). Although such sandboxing can provide security to the user's computer, it becomes increasingly difficult to implement as downloadable programs become more and more complex (e.g., programs may need access to files in order to function properly). Extensions to such sandboxing can be made, giving users the option to reduce the restrictions on such programs. However, such extensions again face the user with the need to keep track of the different security settings for each such application that he or she uses, as well as answer difficult questions about what applications he or she should permit to access the file system.

The invention described below addresses these disadvantages, providing enhanced computer system security scheme in a user-friendly manner.

SUMMARY

A computer system allows a user to create multiple different desktops and easily switch between these desktops. These multiple desktops are "walled off" from one another, limiting the ability of processes and other subjects in one desktop from accessing objects, such as data files or other processes, in another desktop.

According to one aspect of the invention, each time a process is launched it is associated with the desktop that it is launched in. Similarly, objects, such as data files or resources, are associated with the same desktop as the process that created them. The operating system allows a process to access only those objects that are either associated with the same desktop as the process or associated with no desktop.

According to another aspect of the invention, access to systems over a network (e.g., the Internet) are limited on a per-desktop basis. Various access restrictions in the form of an address template and corresponding accessibility (for example, "allow access" or "deny access") can be input by the user for a particular desktop. Such restrictions affect all processes launched in that desktop that attempt to access systems over the network. Thus, a user can provide general restrictions for a desktop (for example, in a "work" desktop the only system that is accessible over the Internet is the corporate server) and be assured that any application, regardless of its source, that is running in that desktop is limited by such restrictions.

According to another aspect of the invention, a process that desires access to a particular object can request that the object be associated with the same desktop as the process. The user is notified of the request and given the opportunity to either approve or disapprove of the association. If the user approves, then the association is made; otherwise the request is rejected.

According to another aspect of the invention, an application programming interface (API) is provided that allows processes to identify which desktop an object is associated with and to request that the object be associated with the same desktop as the process.

According to another aspect of the invention, a graphical user interface is provided that allows the user to easily change between different desktops and thus easily change the security for a new application. For example, if the user is going to run a new application, he or she can easily switch out of his or her "personal" desktop and into a more restricted "play" desktop, being assured that the new application will not be able to access personal information associated with his or her "personal" desktop. Additionally, a graphical user interface is provided that allows the user to create and change network access restrictions for the desktops.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The invention uses multiple desktops corresponding to a user to create an easily-understandable, user-friendly security scheme for a computer system. Application processes executing on a computer system are associated with one of the user's desktops and are allowed to access only data files and other objects that are either associated with that same desktop or associated with no desktop. Such a "walled-off" model provides easily-understandable security to the user, as he or she knows that data files and other objects associated with one desktop (e.g., private, personal data) cannot be accessed by applications (e.g., applications downloaded from an unknown site on the Internet) executing from another desktop.

Exemplary Computer System

In the discussion herein, the invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 1:
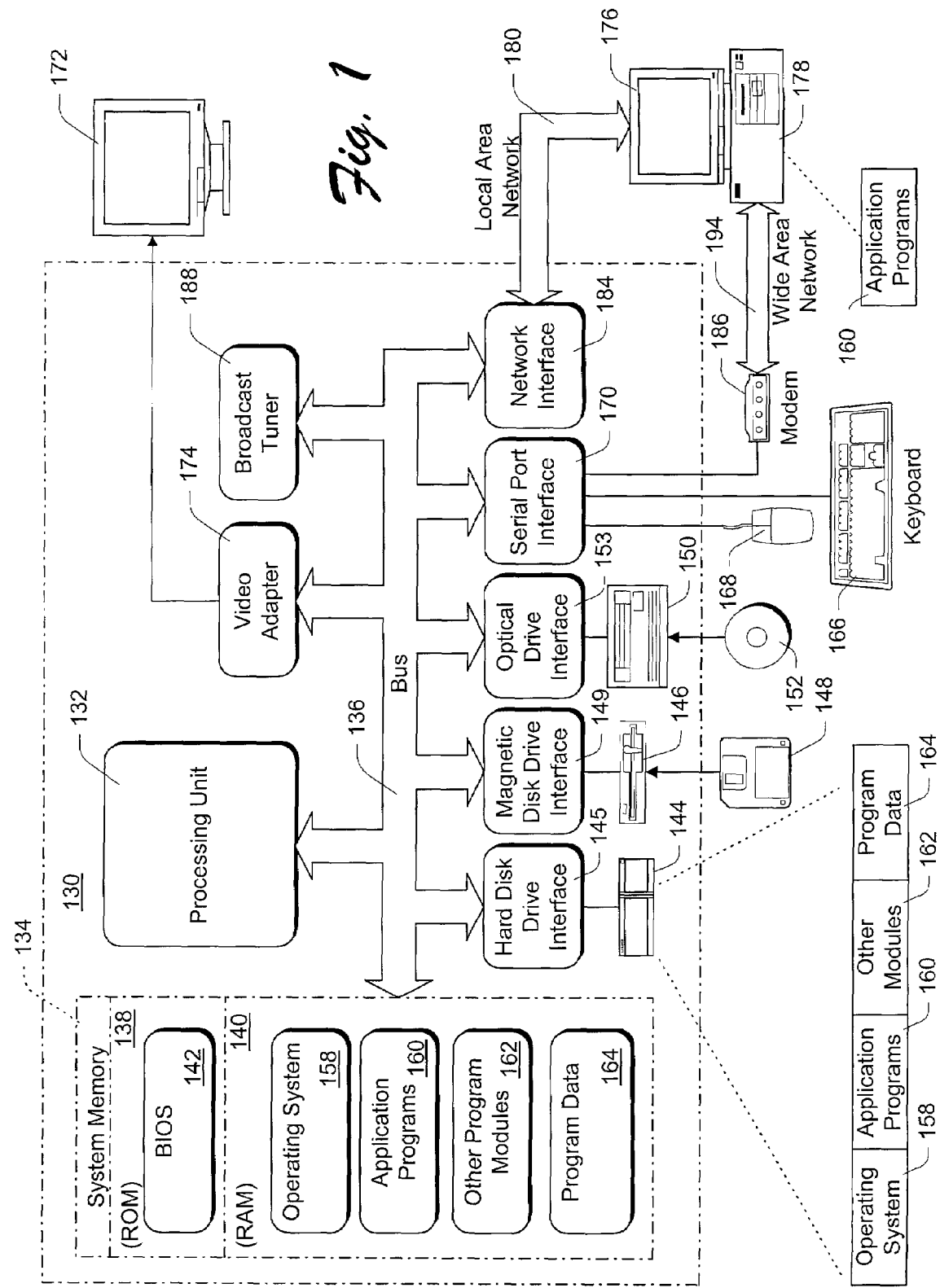
FIG. 1 shows a general example of a computer that can be used in accordance with the invention.

FIG. 1 shows a general example of a computer 130 that can be used in accordance with the invention. Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, connected to bus 136 via a hard disk drive interface 145 (e.g., a SCSI, ATA, or other type of interface); a magnetic disk drive 146 for reading from and writing to a removable magnetic disk 148, connected to bus 136 via a magnetic disk drive interface 149; and an optical disk drive 150 for reading from or writing to a removable optical disk 152 such as a CD ROM, DVD, or other optical media, connected to bus 136 via an optical drive interface 153. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 194. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Wash.

When used in a LAN networking environment, computer 130 is connected to the local network 180 through a network interface or adapter 184. When used in a WAN networking environment, computer 130 typically includes a modem 186 or other means for establishing communications over the wide area network 194, such as the Internet. The modem 186, which may be internal or external, is connected to the bus 136 via serial port interface 170. In a networked environment, program modules depicted relative to the personal computer 130, or portions thereof, may be stored in the remote memory storage device. It will be appreciated that the network connections shown are exemplary and other means of establishing a communications link between the computers may be used.

Computer 130 also optionally includes one or more broadcast tuners 188. Broadcast tuner 200 receives broadcast signals either directly (e.g., analog or digital cable transmissions fed directly into tuner 188) or via a reception device (e.g., via an antenna or satellite dish).

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Multiple Desktop Security

Many operating systems provide a graphical user interface (GUI) that allows the user to interact with the computer in a more graphical manner as opposed to a more antiquated command-line interface. A GUI typically provides a graphical "desktop", which is an interface designed and intended to represent a real desktop, including various icons and graphical representations of objects that might be found on a real desktop (e.g., file folders, documents, a clock, windows with open files, etc.). Additionally, some operating systems, such as the "Windows" brand of operating systems available from Microsoft Corporation of Redmond, Wash., allow different users to log on to a computer system and customize their own desktops individually, such as by changing the locations of icons on the desktop, changing color schemes used on the desktop, etc.

Furthermore, some operating systems, such as the "Windows NT" operating system (available from Microsoft Corporation), allow individual users to have multiple desktops and further allow such users to easily change between desktops. Each of the multiple desktops can be running by the operating system concurrently, although the user can interact with only one at any given time.

Figure 2:
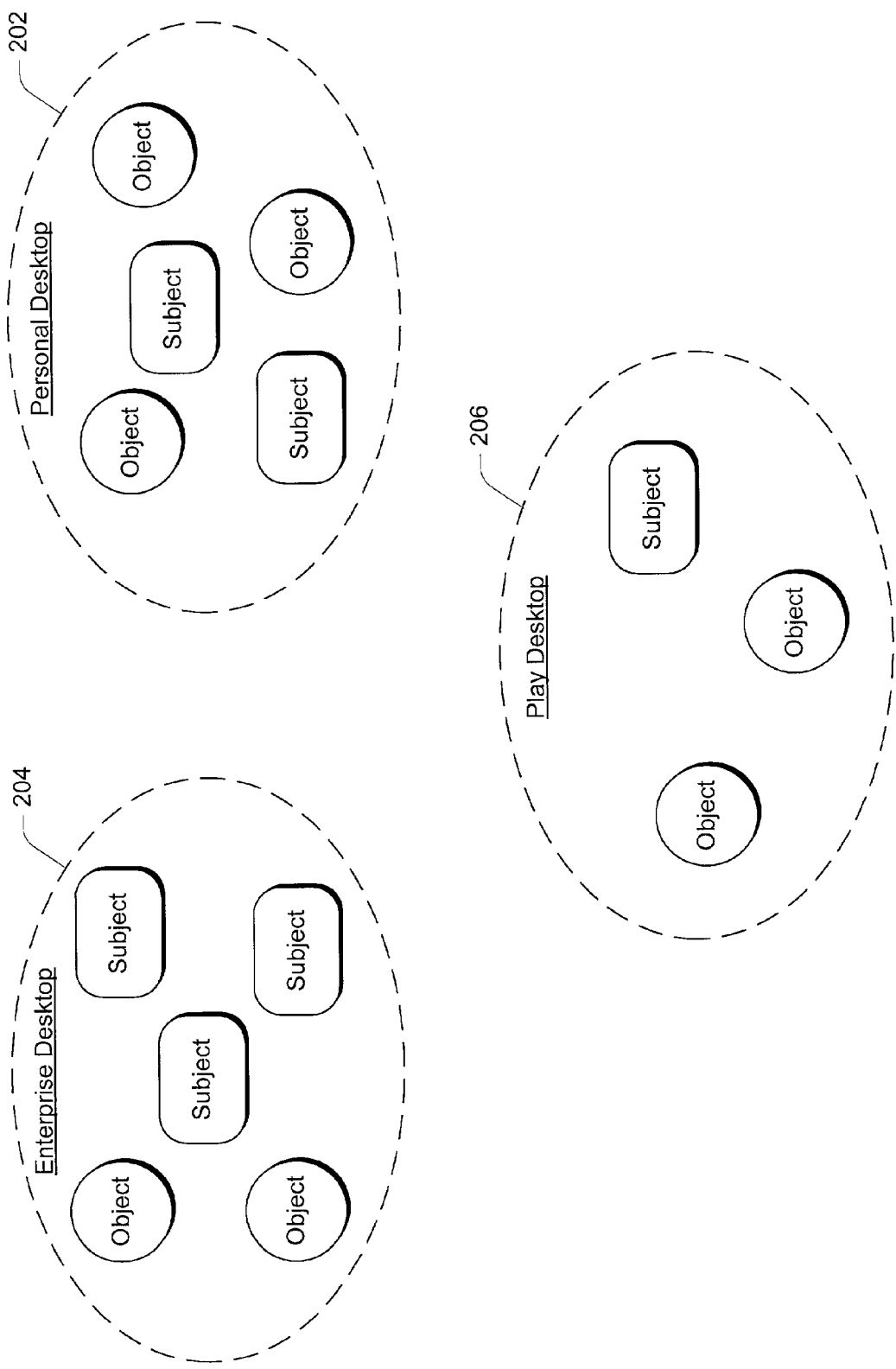
FIG. 2 is an exemplary illustration of the use of multiple desktops to enhance system security according to one embodiment of the invention.

FIG. 2 is an exemplary illustration of the use of multiple desktops to enhance security according to one embodiment of the invention. The multiple desktops can be implemented on any of a variety of conventional computers, such as computer 130 of FIG. 1.

In the example of FIG. 2, three different desktops for a user exist on a computer system: a personal desktop 202, an enterprise desktop 204, and a play desktop 206. Personal desktop 202 is used for sensitive personal information and applications that operate on such information. For example, a user may run a financial application and access corresponding data files in personal desktop 202. Enterprise desktop 204 is used for work-related data and applications. For example, a user may run a word processing application and access corresponding work-related data files in enterprise desktop 204. Additionally, a user may access a corporate server (e.g., via the Internet) from desktop 204. Play desktop 206 is used for games and other "recreational" applications and data. For example, a user may surf the Internet and download various programs from different locations on the Internet in play desktop 206. Alternatively, additional or fewer desktops can be created by the user.

Each desktop 202–206 can have associated with it one or more "objects" and one or more "subjects". Objects refer to system files or resources that are operated on or accessed by a subject. Examples of objects include application files, data files, communication endpoints (network locations), running processes, etc. Subjects refer to system resources that are doing the operating or accessing. Examples of subjects include running processes, running threads, etc. Some resources can be both a subject and an object. For example, a process that is operating on an object is referred to as a subject, while a process that is being operated on by a subject is referred to as an object.

Each of the desktops 202–206 are "walled off" from one another. Subjects in a particular desktop can access objects within that same desktop, but not within any other desktop. For example, a subject in personal desktop 202 can operate on any of the objects within personal desktop 202; however, a subject in personal desktop 202 cannot operate on any objects in either enterprise desktop 204 or play desktop 206. By prohibiting operation on an object by a subject in another desktop, a user can create security barriers or "walls" that protect system files and resources. For example, if personal information (e.g., a bank account number) is available in a data file associated with personal desktop 202, a process running from enterprise desktop 204 or play desktop 206 will be unable to access the data file.

Although a subject cannot operate on an object that is not associated with the same desktop as the subject an object can be associated with multiple desktops. For example, a particular object (e.g., a data file including telephone numbers) may be associated with both personal desktop 202 and enterprise desktop 204. Additionally, some objects may not be associated with any desktop.

Figure 3:
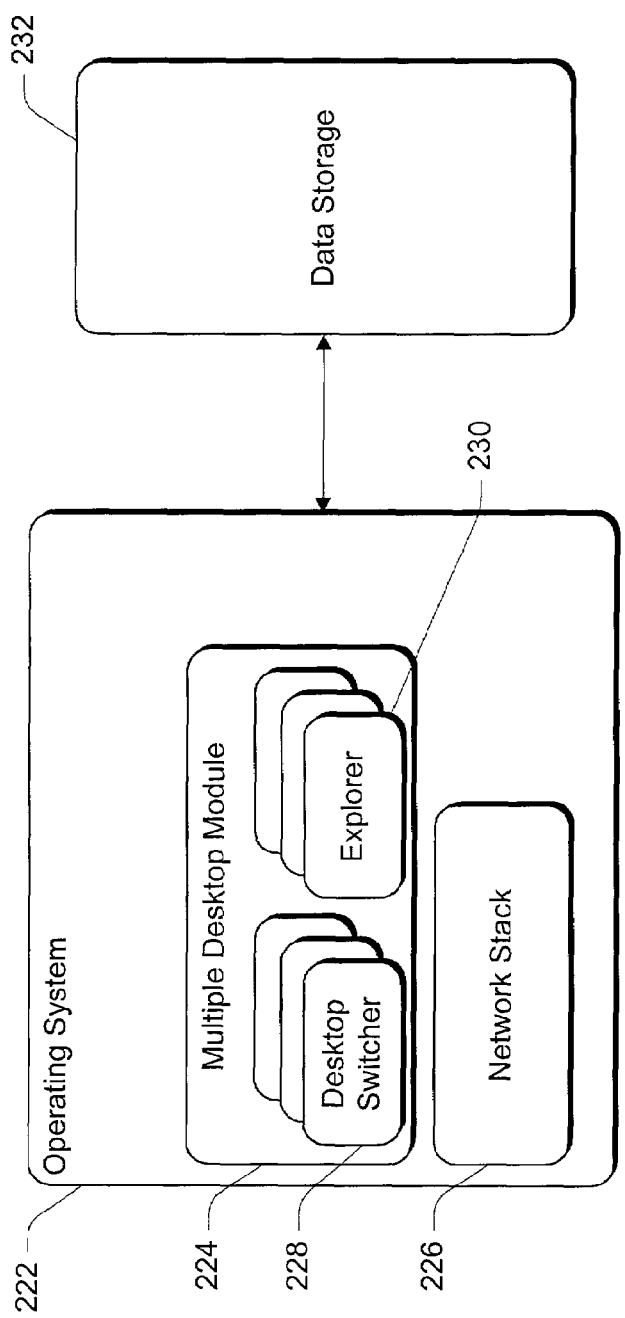
FIG. 3 is a block diagram illustrating exemplary components to support multiple desktop security in accordance with the invention.

FIG. 3 is a block diagram illustrating exemplary components to support multiple desktop security in accordance with the invention. Operating system 222 includes a multiple desktop module 224 and a network stack 226. In the illustrated example, operating system 222 is an operating system that supports multiple desktops for a single user (such as the "Windows NT" operating system), via multiple desktop module 224. Operating system 222 further allows new desktops to be created (for example, in the "WindowsNT" operating system via the CreateDesktop( ) Application Programming Interface (API)), and the current desktop to be switched from one desktop to another (for example, in the "Windows NT" operating system via the SwitchDesktop( ) API).

Module 224 includes desktop switcher 228 and explorer 230. Multiple instances of both desktop switcher 228 and explorer 230 run concurrently, one instance for each of the user's desktops. Desktop switcher 228 allows users to switch between desktops as well as create and remove desktops. Explorer 230 is a shell providing file system access for each of the desktops. Various modifications are made to the multiple desktop module 224 to support the enhanced security of the invention, as discussed in more detail below.

Operating system 222 maintains a data storage 232 of various control information and data pertaining to the computer system. In the illustrated example, data storage 232 includes the system registry.

Operating system 222 also limits the ability of a process that is running in a desktop to access a network. Network accesses from a process are received by network stack 226 and forwarded to multiple desktop module 224. Multiple desktop module 224 maintains various network access policies (e.g., in data storage 232) on a per-desktop basis, which are used to determine whether the requesting process is allowed to make the desired network connection (based on which desktop the process is associated with). These network access policies can be negative (e.g., deny nonsecure connections, deny any Internet connection, deny access to particular network addresses, etc.), or positive (e.g., allow access to only "www.mybank.com", allow connections only to a particular address (such as the corporate Internet), allow only secure connections (such as using HTTPS), etc.). The user is able to assign these restrictions for each desktop, allowing the user to allow network access that he or she is comfortable with for each desktop.

Additionally, multiple desktop module 224 also maintains user group information that allows different users to share a particular desktop. A user that creates a desktop can allow other users to use that desktop as their current desktop. However, the association of an object with a desktop is a "desktop restriction", not a "user restriction". Thus, although other users can be allowed access to the desktop, when using this desktop as their current desktop these other users are still restricted to accessing only objects that are associated with this desktop.

Operating system 222 also maintains various control information regarding subjects and objects. In the illustrated example, operating system 222 maintains an access token for each process running in the system (threads have the token of their corresponding process) and a security descriptor for each object in the system. The access token and the security descriptor are discussed in more detail below with reference to FIGS. 4 and 5.

Figure 4:
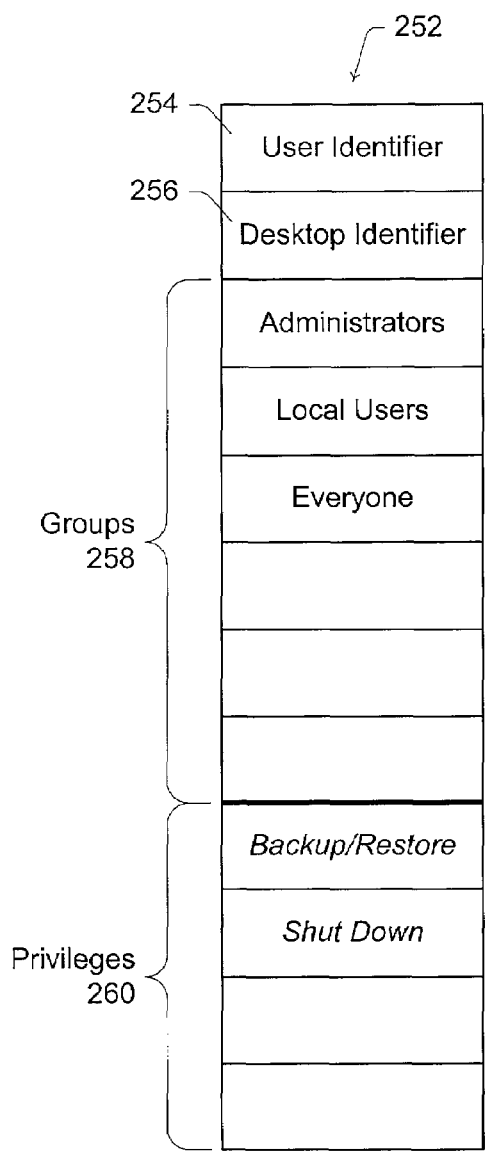
FIG. 4 illustrates an exemplary access token according to the invention.

FIG. 4 illustrates an exemplary access token according to the invention. Access token 252 includes an owner identifier 254, a desktop identifier 256, group identifiers 258, and privileges 260. These identifiers and privileges are assigned to the process by operating system 222 when the process is launched.

User identifier 254 (also referred to as a security identifier or "SID") identifies the user that launched the process (an identifier of the person logged on to the computer when the process was launched). Desktop identifier (or SID) 256 identifies the desktop that the process corresponds to (an identifier of the desktop in which the process was launched). Group identifiers 258 identify the groups that the user identified by identifier 254 is part of. In the illustrated example, the user is a member of the "Administrators", "Local Users", and "Everyone" groups when logged on to the computer.

Privileges 260 indicate the privileges that the process has. In the illustrated example, privileges 260 include a "Backup/Restore" privilege that allows the process to read any file in the file system, and the "Shut Down" privilege allows the process to power down the computer. The determination of which privileges a process has is made by operating system 222 based on the process itself and/or the groups (identified by group identifiers 258) the user is part of.

Figure 5:
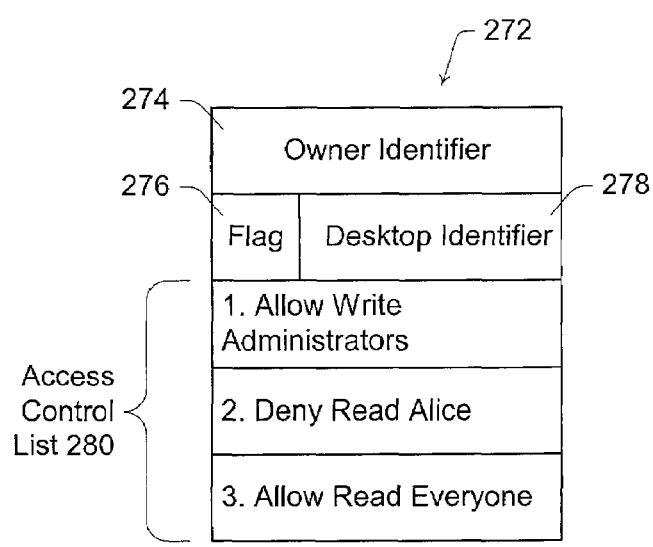
FIG. 5 illustrates an exemplary security descriptor according to the invention.

FIG. 5 illustrates an exemplary security descriptor according to the invention. Security descriptor 272 includes an owner identifier (or SID) 274, a confinement flag 276, a desktop identifier (or SID) 278, and an access control list 280. Security descriptor 272 is generated by operating system 222 when the object is created. Operating system 222 can alter identifiers 274 or 278, flag 276, or entries in list 280, but prohibits any other process from directly doing so.

Owner identifier 274 identifies the owner of the object (the process that created the object). Confinement flag 276 identifies whether the object is confined to a desktop(s). If flag 276 is set, then the object is confined to a desktop(s), whereas if flag 276 is not set then the object is not confined to any desktop. Desktop identifier 278 identifies which desktop(s), if any, the object is to be confined to (i.e., associated with). An object can be confined to one or more desktops. Upon creation, an object is confined to the desktop that the creating process is running in. Subsequently, objects can be included in additional desktops (although confined objects are normally confined to a single desktop). Access control list 280 provides user-based access to objects that is distinct from the desktop-based confinement of the invention.

Access control list 280 specifies which individual users (or groups) have what access rights to the object. In the illustrated example, access control list 280 indicates that members of the "Administrators" group have write access to the object, that the user "Alice" does not have read access to the object, and that members of the group "Everyone" have read access to the object. Earlier entries in the list 280 override subsequent entries, so in the illustrated example everyone except the user "Alice" would have read access to the object.

Figure 6:
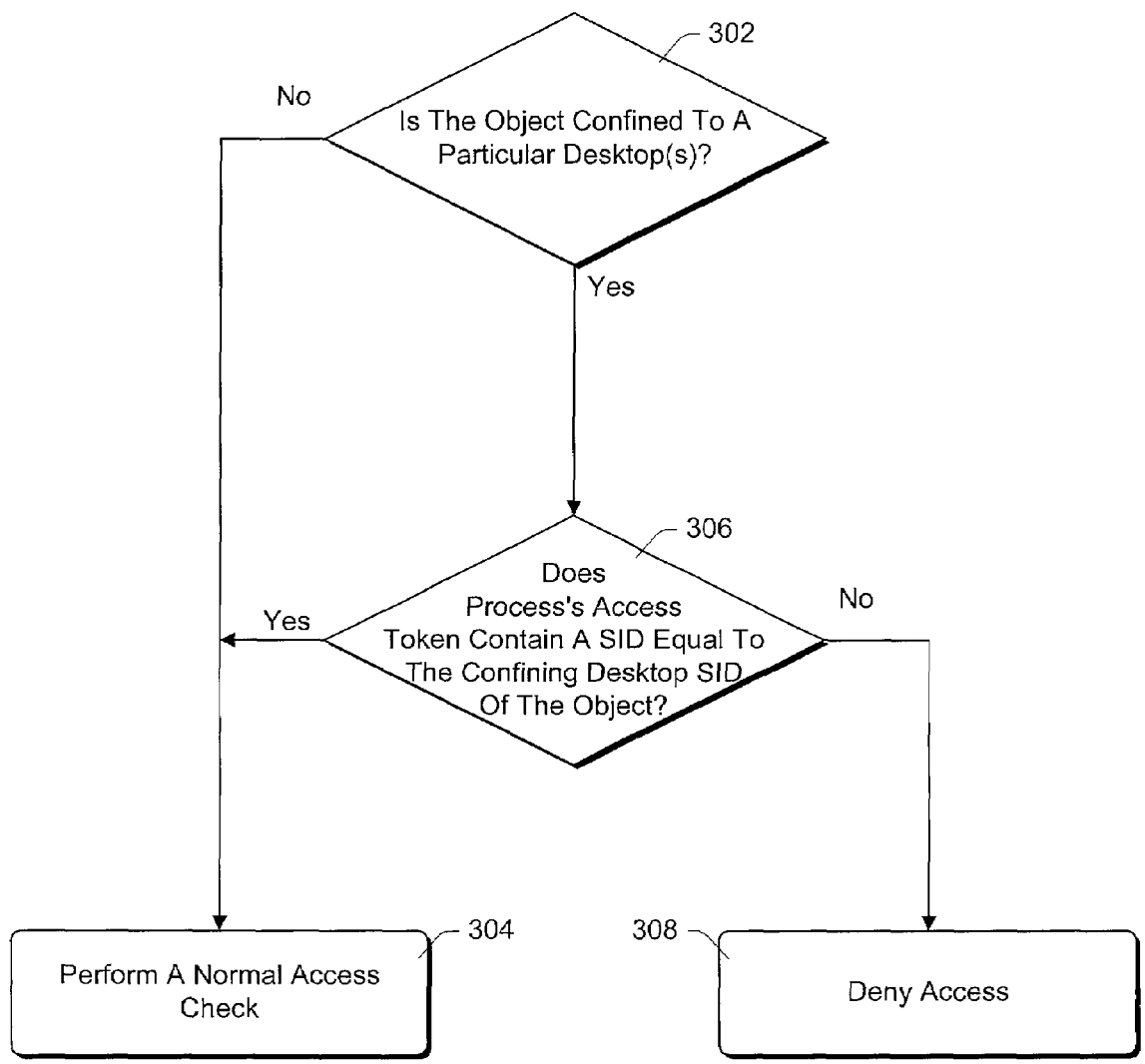
FIG. 6 is a flowchart illustrating exemplary steps in providing security using multiple desktops in accordance with the invention.

FIG. 6 is a flowchart illustrating exemplary steps in providing security using multiple desktops in accordance with the invention. The process of FIG. 6 is implemented by operating system 222, and may be performed in software. FIG. 6 is described with additional reference to components in FIGS. 4 and 5.

During operation, a process (or other subject) eventually requests operating system 222 for access to an object. Upon receiving such a request, operating system 222 checks whether the object is confined to a particular desktop(s) (step 302). This check is made by accessing the security descriptor corresponding to the object and checking whether the confinement flag is set (e.g., confinement flag 276 of security descriptor 272). Alternatively, checking whether the object is confined to a particular desktop can be carried out in other manners, such as by checking whether any desktops are listed in desktop identifier 278 of security descriptor 272).

If the object is not confined then operating system 222 continues with a normal access check (step 304). The normal access check includes using the groups 258 and privileges 260 of the access token 252 as well as the access control list of the security descriptor 272 to determine whether the requesting process has appropriate access privileges to access the object and what limitations (if any) there are on such access.

However, if the object is confined to a particular desktop(s), then operating system 222 checks whether the access token 252 corresponding to the process contains a desktop identifier (in identifiers 256) that is the same as one of the desktop identifiers 278 in the security descriptor 272 corresponding to the object (step 306). If none of the desktop identifiers in identifiers 256 are the same as any of the identifiers in identifiers 278, then access to the object is denied (step 308). Otherwise, access may be permitted and operating system 222 proceeds with a normal access check (step 304).

Thus, a process is only allowed to access an object that is associated with the same desktop as the process. This prohibition exists regardless of what other types of privileges or access rights a process is given over a particular object.

If an attempt by a process to access an object fails, the process may attempt to change the security descriptor for the object so that it is associated with the same desktop as the process. A process or other subject cannot directly change the association of an object with a desktop. However, a process may request, through desktop switcher 228 of FIG. 3, that the association of an object with a desktop be changed.

For example, if a subject in desktop 206 of FIG. 2 wants to access an object in desktop 202, then the subject can submit a request to desktop switcher 228 to change the associations of that object so that it is associated with desktop 206 rather than desktop 202 (e.g., by replacing the identifier of desktop 202 with an identifier of desktop 206 in the desktop identifiers 278 of the object's security descriptor 272 (FIG. 5)). Upon receiving such a request desktop switcher 228 queries the user as to whether the user wishes to allow such a change to be made. For example, desktop switcher 228 may provide a dialog box identifying the subject that requested the change as well as the object to be changed. The user can then either accept or reject the change. If the change is rejected by the user, then the object is not changed to be associated with desktop 206 and the requesting subject is not allowed access to the object. However, if the change is accepted by the user, then desktop switcher 228 replaces the identifier of desktop 202 with an identifier of desktop 206 in the desktop identifiers 278 of the object's security descriptor 272. Subsequent attempts to access the object (from desktop 206) by the subject would then be successful, as both subject and object are associated with the same desktop, although subsequent attempts to access the object from the replaced desktop (desktop 202) would be unsuccessful.

Figure 7:
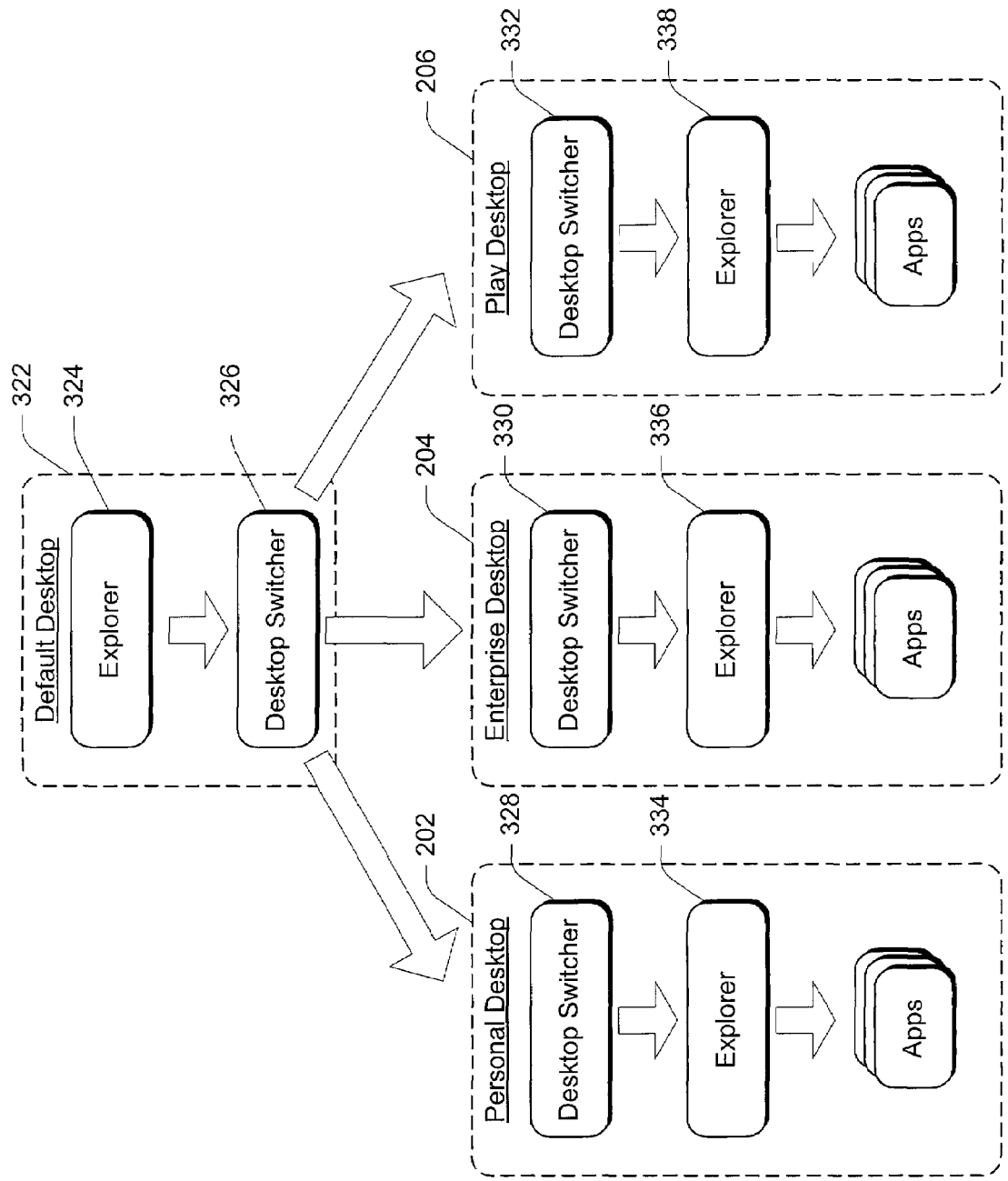
FIG. 7 is a block diagram illustrating exemplary initialization of a system using multiple desktop security in accordance with the invention.

FIG. 7 is a block diagram illustrating exemplary initialization of a system using multiple desktop security in accordance with the inventions. When a user logs on to the computer, a default desktop 322 is initially loaded by operating system 222. Default desktop 322 is distinct from the user-created desktops 202–206. A process launched from desktop 322 is not confined to accessing objects in desktop 322 (e.g., in the access token of FIG. 4 corresponding to the process, the desktop identifier 256 identifies no desktop). Similarly, objects created or launched in default desktop 322 are not confined to desktop 322 (e.g., in the security descriptor of FIG. 5 corresponding to the object, confinement flag 276 is not set and desktop identifier 278 identifies no desktop). Thus, only privileges 260 of the process access token and access control list 280 of the security descriptor operate to prohibit a process in default desktop 322 from accessing any object in the system. A user might switch to the default desktop 322 to carry out various administrative tasks, such as installing software that is to be available to multiple desktops. Otherwise, installing software from one of the desktops 202–206 would limit that software to being executed only from that desktop.

An explorer process 324 of the default desktop automatically launches a desktop switcher process 326. Desktop switcher 326 accesses the system registry to identify the desktops that correspond to the logged on user (that is, the desktops that the user has created). Desktop switcher 326 then launches a "secondary" instance of itself for each of the multiple desktops. In the illustrated example, the user has a personal desktop 202, an enterprise desktop 204, and a play desktop 206, so desktop switcher 326 launches a desktop switcher for each, desktop switchers 328, 330, and 332, respectively. Each of these secondary desktop switchers in turn launches its own explorer process 334, 336, and 338, respectively.

When a user logs on, operating system 222 generates an access token for explorer process 324. This access token includes identifiers of all the groups that the user is part of, identifiers of each desktop that the user has created, and privileges for the process. Each new explorer process 334–338 inherits a restricted token based on this token corresponding to explorer process 324. The restricted token has all privileges removed, all desktop identifiers are removed except for the desktop the process is part of (e.g., the token corresponding to explorer process 336 would include an identifier of desktop 204, but not desktop 202 or 206), and the "Administrators" identifier is removed from the token.

A user can then launch, via the explorer process of the desktop he or she is in, any of a variety of application processes that will inherit the restricted token from the corresponding explorer process 334–338. Each application that is launched by an explorer process 334–338 includes in its access token 252 (FIG. 4) an identifier of the desktop in which it was launched. Thus, any applications launched through explorer processes 334, 336, or 338 will be associated with desktop 202, 204, or 206, respectively.

The desktop switchers 328–332, however, are not restricted as the explorer processes 334–338 are. Desktop switchers 328–332 each retain full access privileges that allow them to access objects and security descriptors for objects in any of the user's desktops.

In one implementation using a "Windows NT" operating system, the desktop switchers 328–332 generate the restricted token using a "CreateRestrictedToken" call. Once the token is generated, the respective explorer processes 334–338 are created using the "CreateProcessAsUser" call. Additional processes can then be launched by explorer processes 334–338, inheriting the restricted token of the launching process 334–338, using the "CreateProcess" call.

Additionally, a user is able to add, delete, and rename the desktops in accordance with his or her liking. A user interface for allowing such changes is described in more detail below. Additionally, although the same application may be launched from two different desktops, each instance of that application can only access objects that are within the same desktop as that instance.

In the illustrated example, if a desktop is deleted, then the desktop switcher instance for that desktop searches through the security descriptors in data storage 232 of FIG. 3 to identify objects that are associated solely with the deleted desktop. The desktop switcher then associates these objects with another desktop, such as default desktop 322. Alternatively, other associations may be made. For example, the user may be prompted to identify which desktop(s) the objects should be associated with, or the objects may not be associated with any desktop (e.g., the confinement flags 276 and identifiers 278 of the objects' security descriptors may be cleared).

As discussed above, the system registry is used to maintain a record of which desktops have been created for each user. If a new desktop is added by a user, then the registry is updated to identify the new desktop. Similarly, if a desktop is deleted, then identifiers of the deleted desktop are removed from the registry.

Additionally, a user is able to switch between different desktops. When a user identifies a different desktop that he or she wishes to make the current desktop, the desktop switcher 326–332 of the current desktop sends a request to operating system 222 (FIG. 3) to make the identified desktop the current desktop.

In the illustrated example, processes can communicate with one of desktop switchers 326–332 via an API. An exemplary API includes "GetDesktopForFile" and "MoveFileToDesktop" functions, as described below. The exemplary API functions operate on objects that are files; analogous functions can be used to operate on other types of objects, or alternatively more generic functions could be used (e.g., a "GetDesktopForObject" and "MoveObjectToDesktop" which are not file-specific).

STDMETHOD(MoveFileToDesktop) (/*[in]*/ LPSTR fileName, /*[in]*/ LPSTR desktopName);
  Description:
    Moves file from current desktop to the specified desktop, returning S_OK on success.
  Parameters:
    fileName: name of file to move.
    desktopName: name of desktop to which file is to be moved.

STDMETHOD(GetDesktopForFile) (LPTSTR fileName, LPTSTR desktopName, ULONG * bufLength);
  Description:
    Retrieves desktop the given file is associated with. Returns S_OK if desktop name was copied to desktopName, S_FALSE if file is not associated with a particular desktop, and ERROR_INSUFFICIENT_BUFFER if buffer was too small. In the latter case, the required size is returned in *bufLen.
  Parameters:
    fileName: name of file to inquire about.
    desktopName: buffer to receive desktop name.
    bufLength: pointer to LONG holding the length of the buffer.

User Interface

Operating system 222 of FIG. 3 provides a graphical user interface (GUI) that allows a user to create desktops and switch between different desktops. FIGS. 8–13 illustrate exemplary dialog boxes and user interface (UI) mechanisms via which a user can use the enhanced security of the invention. The user can actuate buttons in the dialog boxes and mechanisms of FIGS. 8–13 as well as hi-light any list entries via any of a variety of conventional UI actuation mechanisms, such as a pointer, arrow keys, or by tabbing to the desired button and hitting the "enter" key.

In the illustrated example, operating system 222 displays an icon representing a desktop switcher 228 in the system tray. In response to selection of the icon representing the desktop switcher, operating system 222 calls the appropriate desktop switcher instance (e.g., one of desktop switchers 326–332 of FIG. 7) for the current desktop. In response to selection of the icon representing the desktop switcher with one mouse button (e.g., the left button), a desktop switcher dialog box is displayed, and in response to selection of the icon with another mouse button (e.g., the right button), a desktop switcher pop-up menu is displayed.

Figure 8:
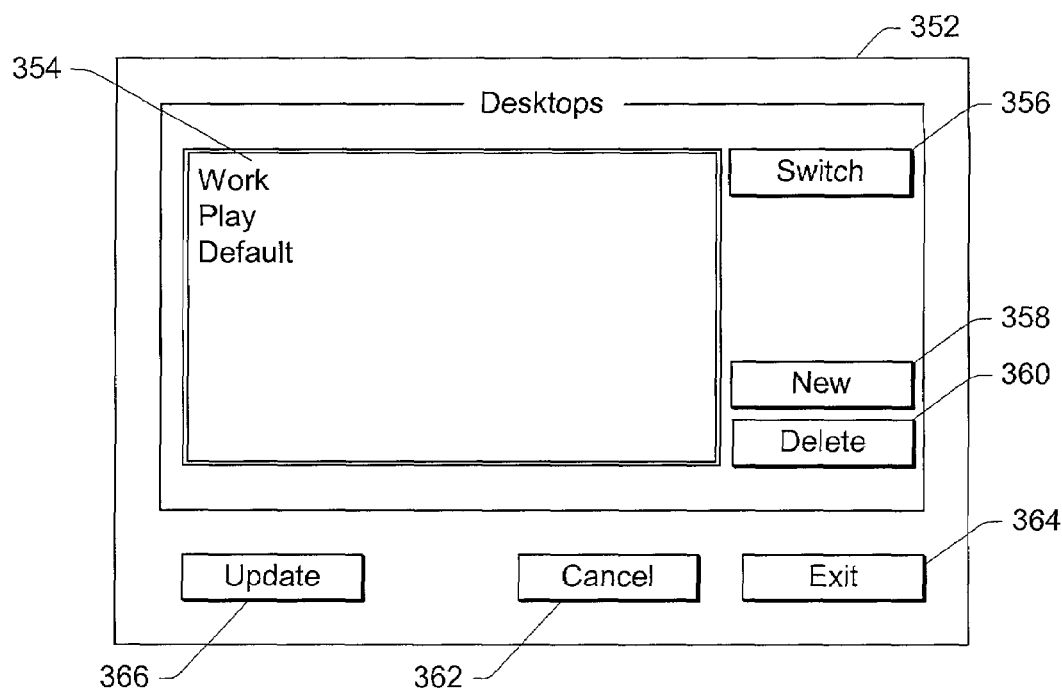
FIG. 8 is an exemplary graphical user interface for switching between different desktops.

FIG. 8 is an exemplary desktop switcher dialog box 352. A display area 354 identifies the different desktops that exist for the currently logged on user, and selection of the switch button 356 causes operating system 222 to switch to whichever of the desktops in display area 354 is hi-lighted. Selection of the new button 358 initiates a configuration wizard via which the user can create a new desktop, and selection of the delete button 360 deletes whichever of the desktops in display area 354 is hi-lighted.

Selection of the cancel button 362 or the exit button 364 closes dialog box 352. Selection of update button 366 refreshes the desktop list in display area 354 (e.g., in the event there has been a change since dialog box 352 was first displayed).

Figure 9:
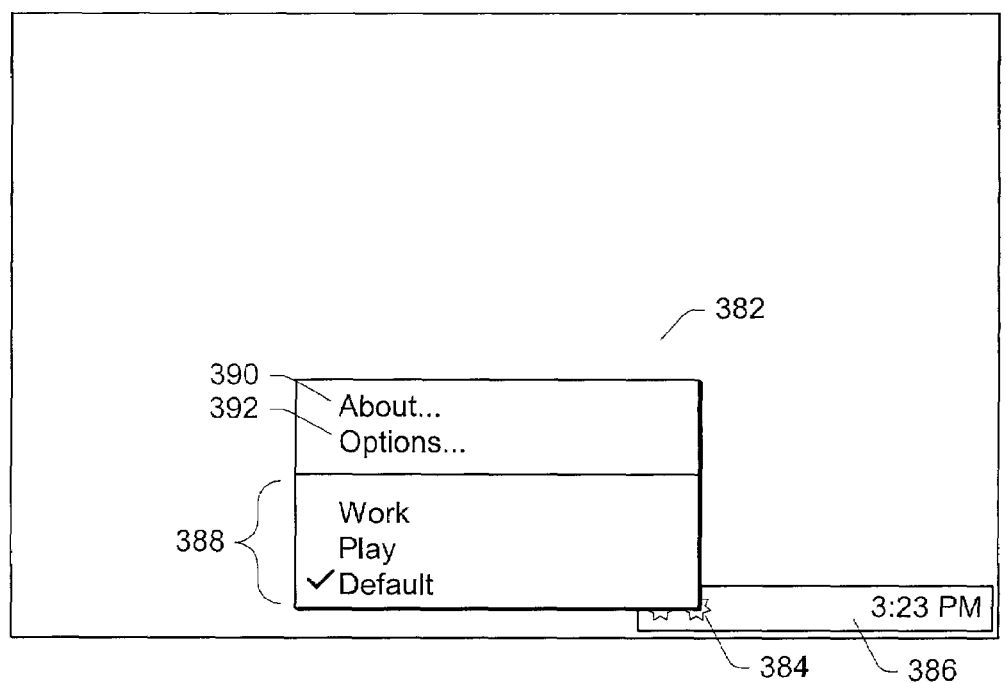
FIG. 9 is another exemplary graphical user interface for switching between different desktops.

FIG. 9 is an exemplary pop-up menu 382. In response to selection of the icon 384 in the system tray 386, operating system 222 displays pop-up menu 382. A bottom portion 388 of menu 382 lists the different desktops that exist for the currently logged on user. The user can change desktops by selecting the desired one in portion 388.

Additional desktop management and information is also available through menu 382. Selection of "About" entry 390 displays a dialog box with information (e.g., serial number, version number, etc.) regarding the desktop switcher 228. Selection of "Options" entry 392 displays an additional configurations dialog box via which the configuration of the current desktop can be changed (such as network access restrictions, as discussed in more detail below).

Figure 10:
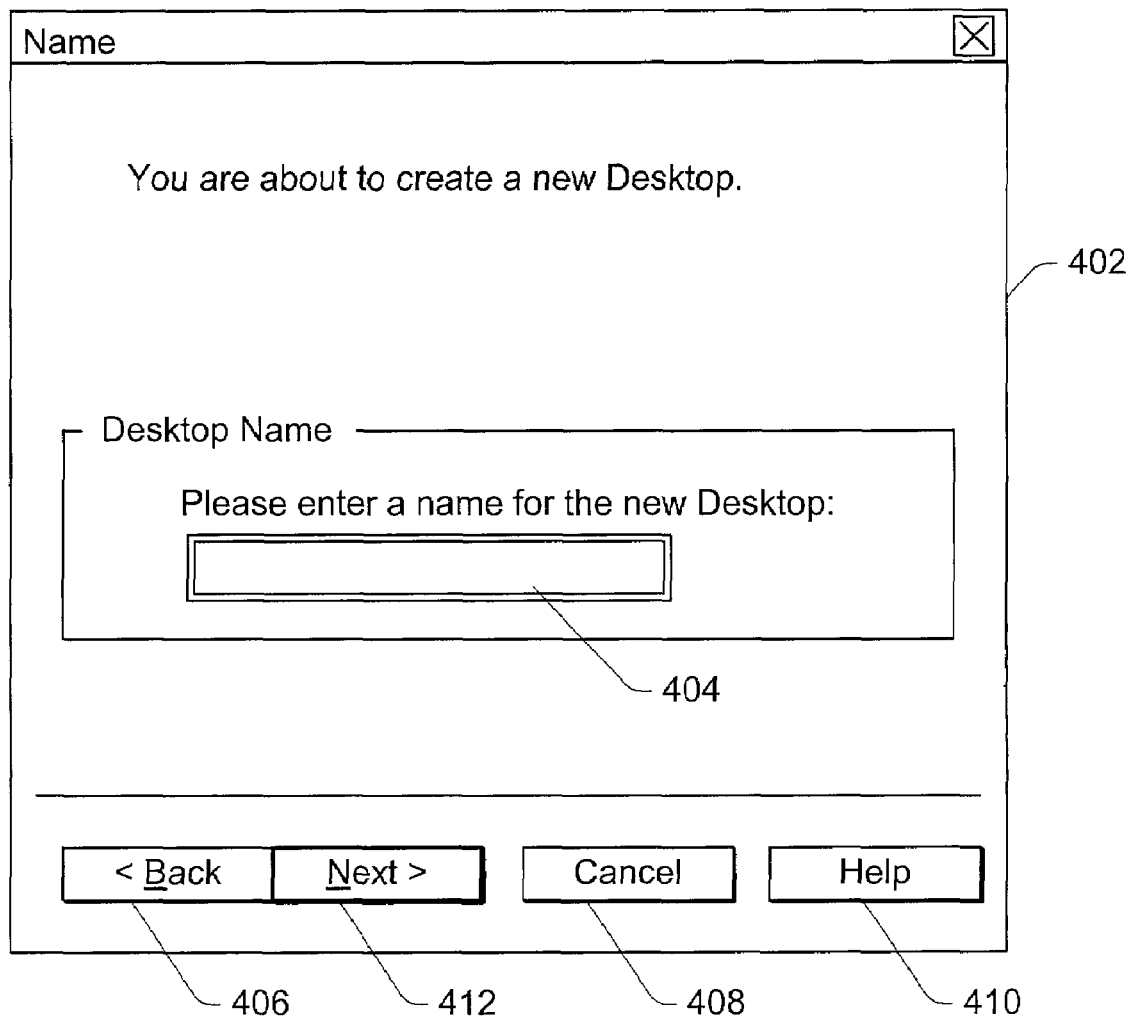
FIG. 10 is an exemplary graphical user interface for creating a new desktop.
Figure 11:
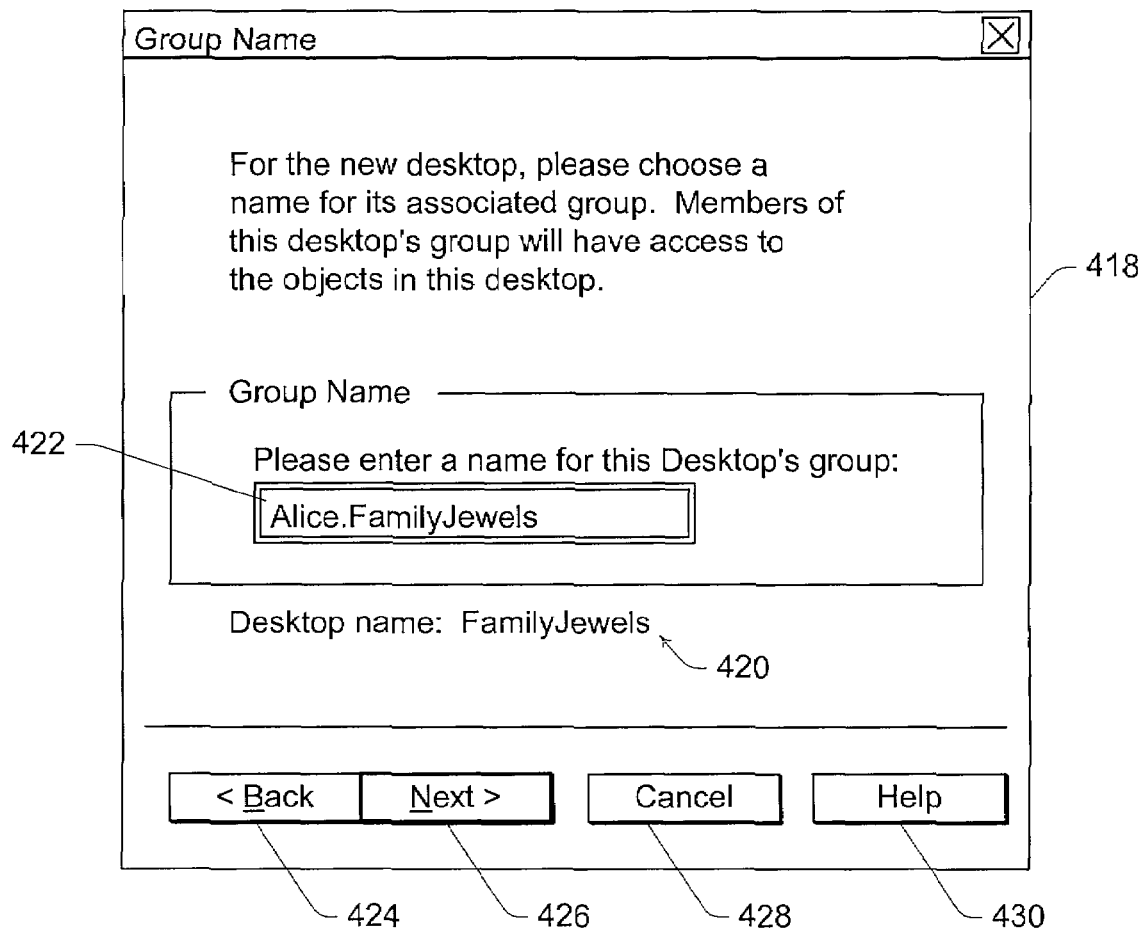
FIG. 11 is an exemplary graphical user interface for identifying user groups for a desktop.

FIGS. 10 and 11 illustrate exemplary dialog boxes displayed when a new desktop is to be created. A dialog box 402 of FIG. 10 is displayed including a data entry area 404 into which a user can enter the name of the new desktop. Actuation of back button 406 returns to the previous dialog box in the new desktop creation process (e.g., dialog box 352 of FIG. 8), actuation of cancel button 408 cancels the new desktop creation process, and actuation of help button 410 provides on-screen assistance to the user. Once the new name is entered and the next button 412 is actuated, a dialog box 418 of FIG. 11 is displayed that identifies the new desktop name 420 ("FamilyJewels" in the illustrated example) and includes a data entry area 422 into which a user can enter a name of a user group for the desktop. Every member of the group identified in data entry area 416 will have access to the new desktop. Desktop switcher 228 defaults to the name of the group being the name of the user creating the desktop ("Alice" in the illustrated example) in combination with the new desk top name. However, the user can override this default entry and enter another group name. Actuation of back button 424 returns to the previous dialog box in the new desktop creation process (e.g., box 402 of FIG. 10), actuation of next button 426 advances to the next dialog box in the new desktop creation process (e.g., box 432 discussed below with reference to FIG. 12), actuation of cancel button 428 cancels the new desktop creation process, and actuation of help button 430 provides on-screen assistance to the user.

Figure 12:
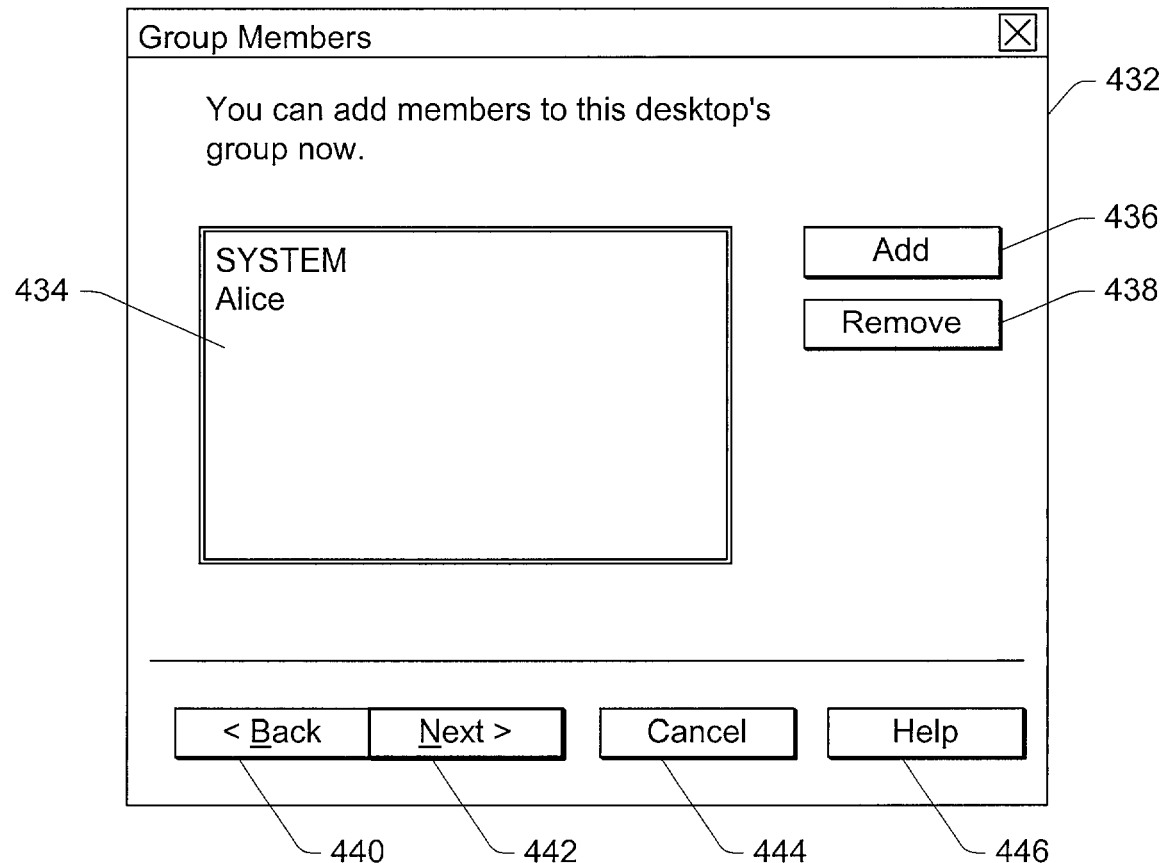
FIG. 12 is an exemplary graphical user interface for adding users to a desktop user group.

FIG. 12 illustrates a user group dialog box via which users can be added to a desktop user group. A dialog box 432 includes a user section 434 which lists the users that are currently part of the group. In the illustrated example, the currently logged in user ("Alice") and a user representing the operating system ("SYSTEM") are currently part of the group. These two users cannot be removed, but additional users can be added. An additional user can be added to the group by actuation of the add button 436 or whichever user is hi-lighted in user section 434 can be removed from the group by actuation of the remove button 438. Actuation of back button 440 returns to the previous dialog box in the new desktop creation process (e.g., box 418 of FIG. 11), actuation of next button 442 advances to the next dialog box in the new desktop creation process (e.g., a "completion" dialog box (not shown) indicating that the new desktop has been successfully created), actuation of cancel button 444 cancels the new desktop creation process, and actuation of help button 446 provides on-screen assistance to the user.

Figure 13:
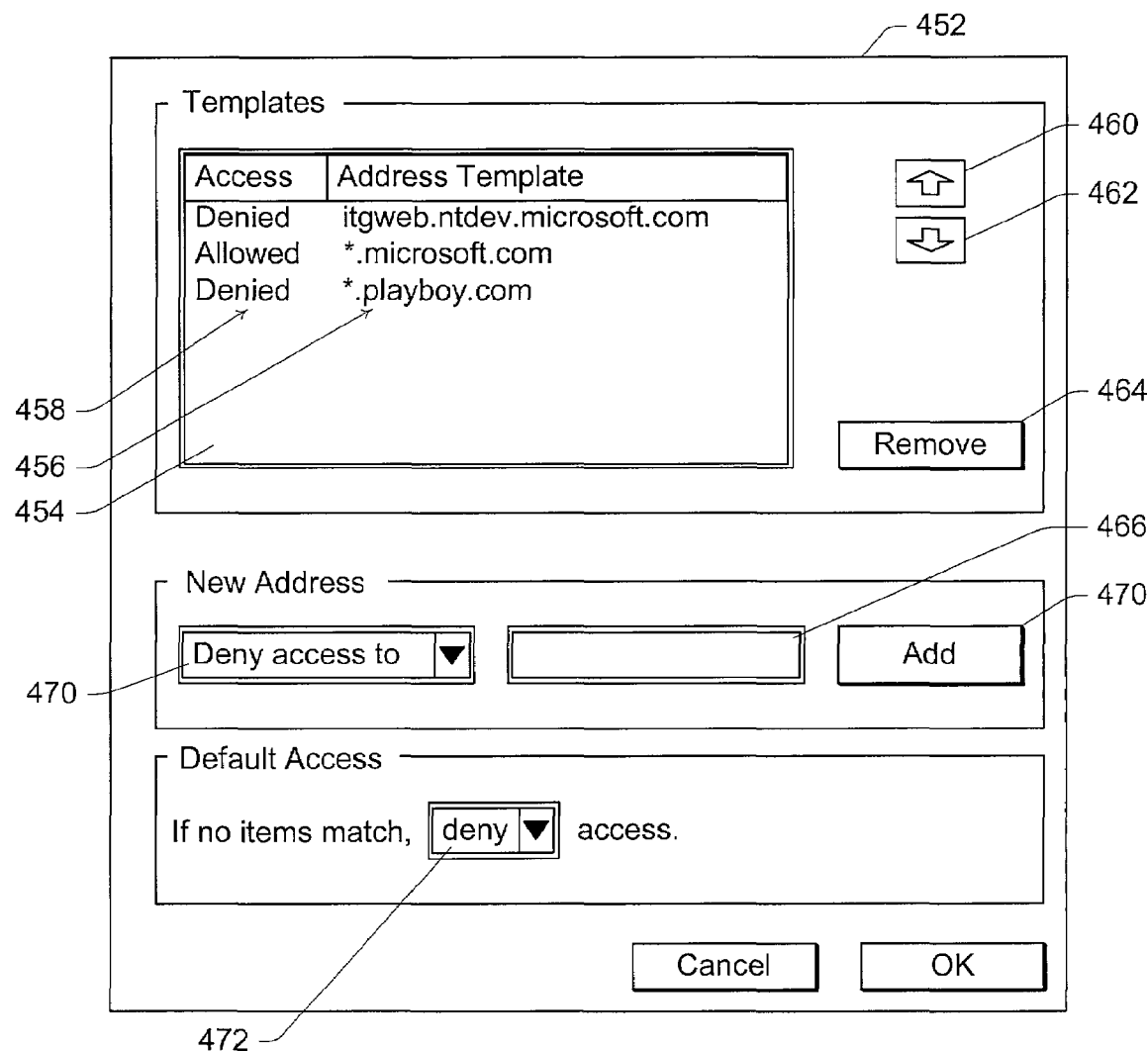
FIG. 13 is an exemplary graphical user interface allowing users to change network access settings for a desktop.

FIG. 13 illustrates a template dialog box via which users can change network access settings for the current desktop. A dialog box 452 includes a templates section 454 which identifies network address templates 456 and corresponding accessibilities 458 for each address template. A user can toggle between "Allowed" access and "Denied" access for a particular template by right-clicking on that template. A user can change the ordering of templates by selecting a template (e.g., hi-lighting the template) and moving it higher in the list by actuating arrow button 460 or lower in the list by actuating arrow button 462. Each of address templates 456 identifies a particular address and may or may not include "wildcards". For example, the wildcard "*" can be used to identify any group of characters, so in the illustrated example access to any address ending in "playboy.com" is denied. Alternatively, other address templates may be used, such as conventional numeric Internet Protocol (IP) addresses.

The templates in section 454 are displayed in the order that they are checked by desktop switcher 228 to determine accessibility. In the illustrated example, the order of the address templates is important. Upon receipt of a network access request, desktop switcher 228 checks each of the templates, in the same order as they are displayed in section 454, to determine whether the requested address matches any of the templates. The accessibility of the first template that matches is used as the accessibility for the requested address. Thus, for example, access to the address "itgweb.nt-dev.microsoft.com" would be denied, whereas access to any other address ending in "microsoft.com" would be allowed.

An address template can be removed by actuation of the remove button 464 while the desired address template is hi-lighted.

Additional address templates can be added by entering the desired template in template entry section 466 and the corresponding accessibility for the new template in access section 468. In the illustrated example, access section 468 is a drop down menu that allows the user to select either. "Deny access to" or "Allow access to". Once the template and accessibility are entered, the template is added by selection add button 470.

Additionally, a user can select the default accessibility for network accesses. The default accessibility entry section 472 identifies the course of action desktop switcher 228 should take in the event a network access request is made for a network address that does not match any of the templates. In the illustrated example, accessibility entry section 472 is a drop down menu that allows the user to select either "deny" or "allow". If "deny" is selected, then access to any address that does not match any of the address templates is denied. Conversely, if "allow" is selected, then access to any address that does not match any of the address templates is allowed.

CONCLUSION

The invention provides for user-friendly enhanced computer system security. A user establishes multiple different desktops, effectively walling off the different areas of security he or she would like to establish. Processes or other subjects associated with one desktop are advantageously prohibited from accessing objects (such as data files) that are associated with other desktops. Thus, for example, the user can be assured that processes executing in the user's "work" desktop or "Internet access" desktop do not have the ability to access any of the data files in the user's "personal" desktop. Additionally, according to one aspect of the invention the user can establish different network access restrictions for different desktops, thereby allowing the user to easily ensure that any process running in a particular desktop (e.g., the "work" desktop) is limited to accessing only particular network locations (e.g., the corporate server).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having stored thereon a computer program that, when executed by one or more processors, causes the one or more processors to perform functions including:

maintaining a plurality of desktops corresponding to a user;

associating each of a plurality of objects with at least one of the plurality of desktops;

associating each of a plurality of processes with at least one of the plurality of desktops; and allowing each of the plurality of processes to access an object of the plurality of objects only if a security descriptor for the object has a desktop identifier that is the same as a desktop identifier in an access token for the process, the security descriptor including the desktop identifier, an owner identifier that identifies the process that created the object, and an access control list.

2. One or more computer-readable media as recited in claim 1, wherein the allowing comprises allowing each of the plurality of processes to perform read accesses to the object.

3. One or more computer-readable media as recited in claim 1, wherein the allowing comprises allowing each of the plurality of processes to perform write accesses to the object.

4. One or more computer-readable media as recited in claim 1, wherein the computer program further causes the one or more processors to perform functions including:

receiving a request from one of the plurality of processes to access a network address;

checking whether access to the network address by the desktop that the process is associated with is permitted; and permitting access to the network address by the process if access to the network address by the desktop that the process is associated with is permitted, otherwise denying access to the network address by the process.

5. One or more computer-readable media as recited in claim 1, wherein each of the plurality of objects comprises one of: a file, a communications endpoint, a process, or a thread.

6. One or more computer-readable media as recited in claim 1, wherein the computer program comprises an operating system.

7. One or more computer-readable media as recited in claim 1, wherein:

the associating each of the plurality of objects with at least one of the plurality of desktops comprises adding to the security descriptor, for each of the plurality of objects, at least one desktop identifier identifying the at least one of the plurality of desktops;

the associating each of the plurality of processes with at least one of the plurality of desktops comprises adding to a process token, for each of the plurality of processes, at least one desktop identifier identifying the at least one of the plurality of desktops; and the allowing comprises allowing each of the plurality of processes to access one of the objects of the plurality of objects only if the process has a desktop identifier in the process token for the process that is the same as a desktop identifier in the security descriptor for the one object.

8. One or more computer-readable media as recited in claim 1, wherein the associating each of the plurality of objects comprises:
for each object adding, to the security descriptor corresponding to the object, the desktop identifier identifying the desktop of the plurality of desktops to which the object is associated.

9. One or more computer-readable media as recited in claim 8, wherein the adding comprises adding the desktop identifier to the security descriptor when the object is created.

10. One or more computer-readable media as recited in claim 8, wherein the associating each of the plurality of objects further comprises:
for each object adding, to the security descriptor corresponding to the object, a flag indicating whether the object is associated with any of the plurality of desktops.

11. One or more computer-readable media as recited in claim 1, wherein the associating each of the plurality of processes comprises:
for each process adding, to the access token corresponding to the process, the desktop identifier identifying the desktop of the plurality of desktops to which the process is associated.

12. One or more computer-readable media as recited in claim 11, wherein the adding comprises adding the desktop identifier to the access token when the process is launched.

13. One or more computer-readable media as recited in claim 1, wherein the computer program further causes the one or more processors to perform functions including receiving a request from one of the plurality of processes to associate one of the plurality of objects with the same desktop as the process is associated with.

14. One or more computer-readable media as recited in claim 13, wherein the computer program further causes the one or more processors to perform functions including:
querying the user as to whether it is acceptable to associate the one of the plurality of objects with the same desktop as the process is associated with;
receiving a response from the user indicating whether it is acceptable to associate the one of the plurality of objects with the same desktop as the process is associated with; and
associating the one of the plurality of objects with the same desktop as the process is associated with if the response indicates it is acceptable to associate the one of the plurality of objects with the same desktop as the process is associated with, and otherwise not associating the one of the plurality of objects with the same desktop as the process is associated with.

15. A method comprising:
maintaining a record of a plurality of desktops corresponding to a user and, for each of the plurality of desktops, a set of objects that corresponds to the desktop; and
for each of a plurality of subjects:
checking whether an object to be accessed by the subject is confined to one of the plurality of desktops, and
if the object is confined to one of the plurality of desktops, then checking whether the object corresponds to the same desktop as the subject based on a desktop identifier that identifies the desktop that corresponds to the object and that is included in a security descriptor for the object along with an owner identifier that identifies the owner of the object and an access control list for the object, and allowing the subject to access the object only if the object corresponds to the same desktop as the subject.

16. A method as recited in claim 15, wherein an object of the set of objects corresponds to multiple desktops of the plurality of desktops.

17. A method as recited in claim 15, wherein the allowing comprises:
checking, in response to a request from the subject to access an object of the set of objects, whether the subject and the object correspond to the same desktop; and
allowing the subject to access the object if the subject and the object correspond to the same desktop, otherwise prohibiting the subject from accessing the object.

18. A method as recited in claim 15, wherein the maintaining comprises maintaining a security descriptor for each object of the set of objects and including the desktop identifier in the security descriptor of the desktop to which the object corresponds.

19. A method as recited in claim 15, wherein each object in the set of objects comprises one or more of: a file, a communications endpoint, a process, or a thread.

20. A method as recited in claim 15, further comprising:
receiving a request from one of the plurality of subjects to access a network address;
checking whether access to the network address by the desktop that the subject corresponds to is permitted; and
allowing the subject to access the network address if access to the network address by the desktop that the subject corresponds to is permitted, otherwise denying access to the network address by the subject.

21. A method as recited in claim 15, wherein each of the plurality of subjects comprises one of a process or a thread.

22. A method as recited in claim 15, wherein the checking whether an object to be accessed by the subject is confined to one of the plurality of desktops comprises checking whether a confinement flag corresponding to the object is set.

23. A method comprising:
allowing a plurality of processes to be launched from a plurality of desktops;
identifying, when a user logs on to a computer, the plurality of desktops corresponding to the user; and
for each process of the plurality of processes,
checking whether the process is associated with the one of the plurality of desktops that the process was launched from,
preventing the process from accessing an object if the object is associated with one of the plurality of desktops but is not associated with the desktop the process was launched from, and
comparing an access token of the process with an access control list of a security descriptor of the object only if the process is not associated with any of the plurality of desktops or if the process is associated with the one of the plurality of desktops that the process was launched from.

24. A method as recited in claim 23, further comprising:
receiving a request from the user to create an additional desktop;
creating the additional desktop; and
preventing a process launched from the additional desktop from accessing an object if the object is associated with one of the plurality of desktops but is not associated with the additional desktop.

25. At least one computer-readable memory containing a computer program that is executable by a processor to perform the method recited in claim 23.

26. A method as recited in claim 23, wherein the object comprises one of: a file, a communications endpoint, a process, or a thread.

27. An apparatus comprising:
a bus;
a processor coupled to the bus; and
a memory, coupled to the bus, to store a plurality of instructions that are executed by the processor, wherein the plurality of instructions, when executed, cause the processor to,
identify which of a plurality of objects are associated with which of a plurality of desktops,
identify which of a plurality of processes are associated with which of the plurality of desktops, and
restrict, based on desktop identifiers of the plurality of processes and desktop identifiers of the plurality of objects, the plurality of processes to accessing only objects which are either associated with the same desktop as the process or associated with no desktop, the desktop identifiers of the plurality of objects being included in security descriptors for the plurality of objects along with owner identifiers that identify owners of the plurality of objects and access control lists of the objects.

28. An apparatus as recited in claim 27, wherein the plurality of instructions, when executed, further cause the processor to receive a request from one of the plurality of processes to change the association of one of the plurality of objects so that the object is associated with the same desktop as the process.

29. An apparatus as recited in claim 28, wherein the plurality of instructions, when executed, further cause the processor to:
receive an indication from a user whether it is acceptable to the user to change the association of the object; and
in accordance with the indication, either change the association of the object or leave the association of the object unchanged.

30. An apparatus as recited in claim 27, wherein the plurality of instructions, when executed, further cause the processor to restrict the plurality of processes to accessing computers over a network by using a plurality of network address restrictions corresponding to the plurality of desktops.

31. An apparatus as recited in claim 30, wherein the plurality of instructions, when executed, further cause the processor to maintain a record of network address restrictions corresponding to each of the plurality of desktops.

32. A computer-readable storage medium comprising computer-executable instructions that implement an interface method, the interface method performing a function comprising:
checking which of a plurality of desktops corresponding to a user is associated with an identified object, the checking being based at least in part on a desktop identifier included in a security descriptor of the identified object along with an owner identifier of the object and an access control list of the object.

33. A computer-readable storage medium as recited in claim 32, the interface method further performing a function comprising returning an indication of the desktop that is associated with the identified object.

34. A computer-readable storage medium as recited in claim 32, the computer-executable instructions further implementing an interface method performing a function comprising:
associating an identified object with a same desktop as a process that requested the associating occur.

35. A computer-readable storage medium as recited in claim 32, wherein the object comprises one of: a file, a communications endpoint, a process, or a thread.

36. In a computer system having a graphical user interface including a display and a user interface selection device, a method comprising:
limiting access to a plurality of objects in the computer system based on desktop identifiers of the plurality of objects, the desktop identifiers being included in security descriptors of the plurality of objects along with owner identifiers that identify owners of the plurality of objects and access control lists of the objects;
displaying a set of desktops corresponding to a user;
receiving a selection of one of the set of desktops from the user; and
changing the access to the plurality of objects based on the selected desktop.

37. One or more computer-readable media having stored thereon a computer program that, when executed by one or more processors, causes the one or more processors to:
maintain a record of a plurality of desktops corresponding to a user and, for each of the plurality of desktops, a set of objects that corresponds to the desktop; and
for each of a plurality of subjects:
check whether an object to be accessed by the subject is confined to one of the plurality of desktops, and
if the object is confined to one of the plurality of desktops, then check whether the object corresponds to the same desktop as the subject based on a desktop identifier that identifies the desktop that corresponds to the object and that is included in a security descriptor for the object along with an owner identifier that identifies the owner of the object and an access control list for the object, and allow the subject to access the object only if the object corresponds to the same desktop as the subject.

38. One or more computer-readable media as recited in claim 37, wherein to check whether an object to be accessed by the subject is confined to one of the plurality of desktops is to check whether a confinement flag corresponding to the object is set.

39. One or more computer-readable media as recited in claim 37, wherein to allow the subject to access the object only if the object corresponds to the same desktop as the subject is to:
check, in response to a request from the subject to access an object of the set of objects, whether the subject and the object correspond to the same desktop; and
allow the subject to access the object if the subject and the object correspond to the same desktop, otherwise prohibit the subject from accessing the object.

40. One or more computer-readable media as recited in claim 37, wherein each object in the set of objects comprises one or more of: a file, a communications endpoint, a process, or a thread.

41. One or more computer-readable media as recited in claim 37, wherein each of the plurality of subjects comprise one of a process or a thread.

* * * * *